United States Patent [19]

Anderson et al.

[11] 4,158,521

[45] Jun. 19, 1979

[54] METHOD OF STABILIZING CLAY FORMATIONS

[75] Inventors: Robert W. Anderson, Fort Worth; Bob G. Kannenberg, Arlington, both of Tex.

[73] Assignee: The Western Company of North America, Fort Worth, Tex.

[21] Appl. No.: 919,215

[22] Filed: Jun. 26, 1978

[51] Int. Cl.² .................... E02D 3/14; E21B 33/13
[52] U.S. Cl. .................................... 405/264; 166/295
[58] Field of Search ............... 61/36 C; 166/294, 295; 106/900; 260/DIG. 14

[56] References Cited

U.S. PATENT DOCUMENTS

| | | | |
|---|---|---|---|
| 2,454,547 | 10/1946 | Bock et al. | 260/567.6 |
| 3,424,681 | 1/1969 | Stanford | 252/8.55 |
| 3,468,816 | 9/1969 | Thompson | 260/2 |
| 3,738,945 | 6/1973 | Panzer et al. | 260/2 BP |
| 3,755,160 | 8/1973 | Witt | 210/54 |
| 3,900,423 | 8/1975 | Markorsky | 260/583 P |
| 3,920,546 | 11/1975 | Newkirk | 210/54 |
| 4,001,486 | 1/1977 | Phillips | 528/470 |

FOREIGN PATENT DOCUMENTS 1111144  11/1957  Fed. Rep. of Germany ... 260/DIG. 14

OTHER PUBLICATIONS

"Aqueous Polymers for Treating Clays in Oil and Gas" by McLaughlin et al.; Society of Petroleum Engineers of Aime-Paper No. SPE6008-1976-available from: SPE-6200 N. Central Exp., Dallas, Tex. 75206.

Primary Examiner—Mervin Stein
Assistant Examiner—Alex Grosz
Attorney, Agent, or Firm—Richards, Harris & Medlock

[57] ABSTRACT

A solution of an oxygenated polyamine, which is the reaction product of dimethylamine and epichlorohydrin, has been discovered to possess excellent stabilization properties when used as a treatment for stabilizing a clay containing formation, for example in the treatment of oil and gas producing boreholes which penetrate clay containing formations. Preferred copolymers of this type which are useful in clay formation treatments include those having epichlorohydrin to dimethylamine mole ratios in the range of from about 0.79 to about 0.93.

16 Claims, 3 Drawing Figures

METHOD OF STABILIZING CLAY FORMATIONS

BACKGROUND OF THE INVENTION

One aspect of this invention relates to stabilization agents which, through attraction to solid surfaces of mineral particles, such as clay for example, of a size less than about 7 microns, cause normally hydratable clay to become permanently stable. Another aspect of this invention relates to treating solutions for well bores passing through natural geological formations which comprise clay or other fine particulate matter, the treating solutions comprising an oxygenated polyamine composition in a diluent. A still further aspect of this invention relates to a method for treating clay formations adjacent boreholes in a manner which stabilizes clay materials present in the formations and subsurface layers penetrated thereby.

Clays, and claylike materials which are subject to swelling and/or dispersion with subsequent loss of permeability and reduction in mechanical strength sometimes present major problems in recovering minerals from geological formations. Clay containing bodies are often substantially impermeable or at least have a low permeability to fluids or lose some or all of the permeability that they may possess when they are subjected to the actions of liquids such as water, and water containing emulsions. Thus, clay contained in formations present in or adjacent to boreholes can be subject to swelling, disruption and/or migration when producing fluids such as hydrocarbons, or when water, gels and other types of stimulation fluids are injected into the geological formation. Furthermore, clay in the form of a clay containing mud is sometimes introduced into a formation where it is not naturally present.

Clays which are present in the geological formation can reduce the permeability of that formation by swelling and/or migrating to form bridges or blockages in the pores of the formation or in perforations in casing screens and similar articles used in well completions. Such swelling and migration results when aqueous liquids used (or produced) during oil production operations come into contact with the clay materials. Furthermore, clay which is used as a component of drilling muds can invade the formation during the drilling of the borehole. For example, high swelling montmorillonite is often used in drilling muds because of its ability to create a low permeability filter cake on the formation face, among other reasons. However, such a low permeability zone may be created, undesirably, within the formation in the vicinity of the borehole because of invasion therein by the drilling mud.

Among the clays which may be present originally in natural geological formations, or may have been introduced therein, and which can be effectively treated in accordance with the present invention are clay materials of the smectite (montmorillonite) group such as montmorillonite, saponite, nontronite, hectorite, beidellite, and sauconite; the kaolin group such as kaolinite, nacrite, dickite, endellite and halloysite; the illite (hydrous-mica) group such as hydrobiotite, glauconite, and illite; the chlorite group (both 7 and 14 angstrom basal spacings) such as chlorite, greenalite and chamosite; clay minerals not belonging to the above groups such as vermiculite, palygorskite (attapulgite) and sepiolite; and mixed-layer (both regular and irregular) varieties of the above minerals. The clay content of the formations can be comprised substantially of a single species of a clay mineral or several species, including the mixed-layer types of clay. Of the clay minerals commonly encountered in the drilling of wells in natural geological formations which can be productive of the difficulties herein noted and which can be treated effectively in accordance with the present invention are clay minerals selected from the class consisting of montmorillonite group, illite (hydrous-mica group), chlorite group and kaolin group. It will be understood that the clay-containing formations treated in accordance with the invention need not be composed entirely of clay but may contain other mineral components associated therewith. Formations which consist largely of clay can, upon contact with water, or water containing fluids, swell and these swelled clays can develop pressures in the order of several thousand pounds per square inch.

The clay materials defined above occur as minute, platelike, tubelike and/or fiberlike particles having an extremely large surface area compared to that of an equivalent quantity of a granular material such as sand. This combination of small size and great surface area results in a high surface energy with attendant unusual surface properties and extreme affinity for surface active agents. The structure of some of these clays, as for instance montmorillonite, can be pictured as a stack of sheetlike three layer lattices which are weakly bonded to each other and which are expanded in the "C" crystallographic direction by water or other substances which can penetrate between the sheets and separate them.

All clay materials have ion exchange properties. Thus for example montmorillonite has a cation exchange capacity of from about 90 to 130 milliequivalents per 100 grams of pure clay, illite from about 20 to about 40 milliequivalents, and kaolinite from about 5 to about 15 milliequivalents. Under ordinary oil well conditions the ion exchange reactions between the clays and substances associated with the clays and capable of reacting therewith are essentially reversible in nature.

The properties of clays vary widely with the cations occupying the base exchange positions or sites. A "base exchange position or site" can be defined as an area, in this instance on the surface of a clay crystal, which has associated with it an exchangeable cation. Among the cations which are generally found on the base-exchange position or site can be mentioned sodium, potassium, calcium, magnesium, iron, hydrogen and the like. These cations are believed to be held on the clay surface by ionic forces.

In addition to clay materials, other fine mineral particles of a size less than about 7 microns can cause blockage problems during production operations. It is therefore desirable to stabilize these "fines" as well as any clay particles which may be present in a given formation.

In the past, well bore holes have been treated with clay stabilization agents in an effort to overcome the above described types of problems. For example, U.S. Pat. No. 2,761,835 discloses a method of stabilizing a clay containing body which includes contacting the clay with substituted ammonium ions derived from aliphatic nitrogen compounds of a specific nature. However, these types of clay stabilization agents tend to alter the wettability of the formation which can cause problems during completion and production. Specifically these, and other types of stabilizing agents employed in the past, can cause the formation to become "oil wet" as opposed to "water wet". Those skilled in the art believe it to be advantageous to production if the producing formation remains "water wet". Finally, many of the clay stabilization agents which have been available heretofore (such as alum based compositions, for example) have not been permanent in nature since the beneficial effects thereof are lost upon subsequent treatments of the formation with acid and/or fracturing fluids.

Further, epichlorohydrin-dimethylamine copolymers have been used in the past in relatively unrelated applications. For example, U.S. Pat. No. 4,001,486 discloses epichlorohydrin-dimethylamine copolymers which are useful in a method for coagulating synthetic rubber particles. The disclosures of that patent pertaining to the copolymers disclosed to be useful in the present invention are hereby incorporated by reference.

Thus, a clay stabilization additive which would have the desired effect of shrinking hydrated clay and preventing swelling and hydration of nonhydrated clay upon contact with water contained in well treatment solutions would be greatly advantageous in the oil well industry. Further, a clay stabilization agent which is relatively easy to handle and use, is miscible with water and readily soluble in brines and acids, does not alter the wettability of formation surfaces, which provides substantially permanent clay stabilization effects, and which is effective over a wide pH range, would be desirable.

SUMMARY OF THE INVENTION

It has been discovered that a stabilizing agent in the form of a solution of an oxygenated polyamine, and specifically one that is a copolymer product of epichlorohydrin and dimethylamine, can be employed to substantially permanently stabilize clay formations. Preferred copolymers of this type have a mole ratio of epichlorohydrin to dimethylamine in the range of from about 0.79 to about 0.93. A preferred intrinsic viscosity of the copolymer is about 0.04. Any suitable diluent which is a polar solvent, such as water, ethyl alcohol, methanol, glycols, or mixtures of these in water, for example, can be used to carry the copolymers. Aqueous salt brines are preferred diluents. The method of treatment can comprise the injection of an aqueous solution of the polymer into a borehole in a manner which insures sufficient contact with the clay. Aqueous treating solutions of the polymer can be prepared simply, and are of low viscosity, facilitating easy handling. Further, such treating solutions are water miscible, and are readily soluble in brines and acids. Furthermore, the treating solutions are effective over a wide pH range and are therefore useful in strong acids, weak acids, low pH fluids, neutral waters, brines or basic solutions. Formations containing clay which are treated according to the method of the present invention remain substantially unaffected by subsequent well treatments or contact with formation fluids. The amount of clay stabilization agent present in a treating solution thereof is dependant upon the types and amounts of clay present in the formation, the relative size and permeability of the formation to be treated, and the type of solvent employed.

DETAILED DESCRIPTION OF THE INVENTION

Figure 1:
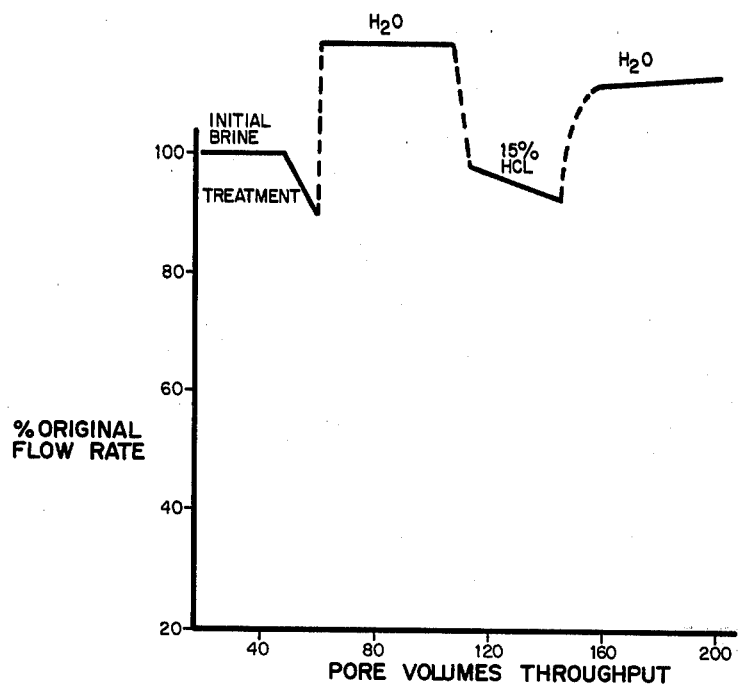

It has now been discovered that effective treatment of clay formations penetrated by boreholes can be accomplished by contacting such formations with aqueous or other solutions comprising an effective amount of a copolymer of epichlorohydrin and dimethylamine as a solute. Formations contacted with such agents maintain satisfactory premeability to fluids, and demonstrate improved mechanical strength and increased resistance to chemical attack. Furthermore, the treating agents of the subject invention which employ copolymers of epichlorohydrin and dimethylamine are simple to mix and have a low viscosity, which facilitates handling. Further, such treating agents are readily soluble and are useful in acids. These treating agents leave the formation water-wet and effect substantially permanent control of the clay mineral particles, thereby making the formations containing these clay minerals relatively stable even after subsequent acid treatments of the formation. Treatment agents of the subject invention do not cause or inhibit emulsion formation and are completely compatible with most non-ionic and cationic surfactants and polymers. Finally, these treating agents are effective over a wide pH range, thus making them useful in strong acids, weak acids, low pH fluids, or neutral liquids. Further, while there are many practical reasons why basic treating solutions are normally avoided, the treating agent of the present invention can be successfully employed with such caustic treating fluids.

Specifically, it has been found that copolymers of epichlorohydrin and dimethylamine wherein the mole ratio of epichlorohydrin to dimethylamine is in the range of from about 0.79 to about 0.93 are surprisingly effective treating agents when used in solution for the stabilization of clay-containing formations. The molecular weight of such polymers will range generally from about 200 to 2000 and especially preferred materials will have an intrinsic viscosity of about 0.04 and molecular weights of from about 1000 to about 2000. These types of polymers are described in the above mentioned U.S. Pat. No. 4,001,486. Furthermore, methods for preparing these types of epichlorohydrin dimethylamine copolymers are disclosed in U.S. patent application Ser. No. 522,381, filed Nov. 11, 1974.

These types of copolymers can be employed as clay stabilizing agents in accordance with the present invention, by dissolving them in appropriate amounts of suitable solvents such as water, ethyl alcohol, glycols and mixed solvents. Preferred solvents are salt brines. Generally, any alkali or alkaline earth metal halide can be dissolved in water to provide such a brine solvent. A particularly preferred brine solvent is an 8% aqueous solution of sodium chloride.

The amounts of epichlorohydrin-dimethylamine copolymer employed in the treating solutions will vary according to, for example, the size and porosity of the particular formation, the type of clay present therein, and the solvent employed. However, generally concentrations of from about 0.5 to about 25.0 pounds per thousand gallons of treating solution have been found to be effective, keeping the above parameters in mind. Concentrations in the range of 2 to 25 pounds per thousand gallons of treating solution are more preferred. Flow data with respect to formation permeability can be used to determine how much of the treating agent should be employed to insure effective treatment. More precise calculations of the amount of epichlorohydrin dimethylamine copolymer treating agent necessary for treatment of any specific formation can be estimated by calculating the milliequivalent base-exchange capacity of the clay formation to be treated and supplying at least 1, and preferably more, milliequivalents of the epichlorohydrin-dimethylamine copolymer.

Basically, treatment of clay formations with the epichlorohydrin-dimethylamine copolymer agents of the present invention can be accomplished by any suitable method which will insure effective and intimate contact between the solution and the clay. Thus, in treating a formation adjacent a well bore, for example, the copolymer solution can be spotted adjacent the formation to be treated and then be permitted to permeate the formation, pressure being used to force the solution into the formation if desired. Additionally, a solution can be used to treat oil well formations by spotting, prior to shooting, a sufficient amount of solution in the well bore adjacent to the section to be shot and then shooting. Also, in gun perforating or jet perforating a well, a solution can be spotted through the interval to be perforated and the gun then inserted and fired in the hole opposite the interval. In secondary recovery, such as waterflood programs, the treating solution can be used in front of the flood to stabilize the clay-containing formation as the flood progresses through the formation, thus precluding a drop in injection rate caused by reduced permeability due to the swelling and/or dispersion of the clay. In treating the formation adjacent the borehole of a well which is producing hydrocarbons, the beneficial results of this invention can be obtained by treating the formation with a sufficient amount of treating fluid to achieve a penetration of at least 3 feet and preferably from about 3 to about 20 feet and then returning the well to production.

A particularly preferred method for treating a clay-containing formation so as to stabilize it by contact with the treating agent of the present invention is as follows. First, the formation is contacted with a nonswelling aqueous medium, such as an aqueous solution of potassium chloride, ammonium chloride, calcium chloride, sodium chloride and mixtures thereof, for example. Next, an effective amount of a copolymer of epichlorohydrin and dimethylamine, preferably in a brine (8% NaCl) solution is introduced into the formation. Finally, the formation is "afterflushed". This will help insure that the treating agent is spread into areas of the formation which were not contacted during direct introduction of the treating solution. The afterflush preferably will be a brine introduced for that purpose but can be accomplished incidentally such as where the primary treatment is fracturing and the clay stabilization agent is included in the pad.

The mechanism by which the copolymers of epichlorohydrin and dimethylamine stabilize clay and other particulate material of less than about 7 microns in size is not fully understood. It is believed that the attraction of the substituted ammonium ions and/or substituted amines to the surfaces of such materials contributes to the stabilizing effects. Thus, while the mechanism is unclear, it has been discovered that the copolymers of epichlorohydrin and dimethylamine described above provide excellent stabilization effects to clay and other particulate matter. Treatment of such materials with the stabilization agent of the present invention inhibits swelling due to contact with water, and actually is believed to cause shrinking of swollen clay which is contacted therewith, as well as providing increased resistance to mechanical and chemical attack.

EXAMPLES

The following examples are submitted for the purpose of illustrating the advantages of the clay stabilization agents of the present invention and for facilitating a better understanding of the present invention by those skilled in the art. Thus, the following examples are submitted for illustrative purposes only and are not intended to limit the invention in any manner.

Example 1

This example is submitted for the purpose of showing the comparative clay stabilization effects of possible clay stabilizing agents, including some organic polymers containing amine groups. The results of these tests are tabulated in Table 1, set forth below. All of the samples tested were subjected to the procedures set forth in detail below.

Thus, in each instance, a one gram sample of clay (325 mesh bentonite) was mixed into 40 cc treating solution. Each treating solution was compounded in a manner so as to provide 10 lbs. of active agent per 1000 gallons of an 8% NaCl brine, buffered (with approximately 10 lbs. of sodium dihydrogen phosphate) to effect a pH of about 5.9. The clay samples were allowed to soak in the treating solutions for approximately fifteen minutes. Then the clay sample-treating solution mixture was centrifuged for about five minutes at 1000 RPM. The treatment fluid was then decanted off and approximately 41 ml. of deionized water was thoroughly mixed with the treated clay. After fifteen minutes, to allow for hydration and swelling of the clay, the samples were again centrifuged for about five minutes at 1000 RPM (approximately 220 g). Visual appearance of the clay and water were observed and recorded as shown in Table 1.

The criteria used to judge the effectiveness of the treating agents were:

(1) ml. flocculent or fine precipitate, (2) ml. swollen somewhat translucent clay (1 and 2 were sometimes used together as a primary consideration, since a distinction between the flocculent and the swollen clay was sometimes difficult to observe) and, (3) the amount of clay suspension formed (this refers to a rather heavy concentration of clay and water which gives a distinct boundary against the water).

In addition, the water clarity was observed and judged as either clear, slightly turbid, turbid or very turbid.

As can be determined from a study of Table 1, clay samples treated with various treating solutions demonstrate different degrees of stabilization since clay suspension and swelling and water clarity varied widely depending upon the agent employed. The results of these tests should be compared to the results obtained in Table 2, described in detail in Example 2.

TABLE 1

COMPARATIVE ANALYSIS OF CLAY STABILIZING AGENTS
(Quantities to Give 10 lb Actives/1000 Gal)

| Quantity per 1000 gal 8% NaCl (pH 5.9) | Active Agent | Appearance of Clay | | | Appearance of Water | | | | Solution pH |
|---|---|---|---|---|---|---|---|---|---|
| | | ml., Gray (fine) Flocculent ppt. | ml., Swollen Clay | ml., Clay Suspension (sharp boundary against $H_2O$) | ml., Very Turbid | ml., Turbid | ml. Slightly Turbid | ml., Clear | |
| 1.2 gal | bis-2-hydroxy ethyl cocoa amine | 0.5 | 4.5 | (The amine formed a precipitate in the brine | | | | 37 | 6.95 |
| 3.6 gal | Na polyacrylate | 1 | 5 | | 36 | | | | 5.45 |
| 3.6 gal | cocoa amine hydrochloride | 7 | | | | | 35 | | 5.85 |
| 10 lb | acrylamide copolymer with [structure shown] | 8 | | | | | | 35 | 5.75 |
| 4.1 gal | dimethyl cocoa amine HCl | 1 | 7 | | 30 | | 5 | | 5.75 |
| 10 lb | N,N-trimethyl ethanol amine acrylate methyl sulfate-acrylamide polymer | | 9.5 | | | | | 33 | 5.95 |
| 10 lb | polyvinyl pyrrolidone | 10 | | | | | | 31.5 | 5.9 |
| 1.2 gal | polyethylene oxide | 11 | | | 31 | | | | 6.3 |
| 2.77 gal | 50-50 mix trimethyl tallow ammonium chloride & dimethyl dicocoa ammonium chloride | 0.5 | 11 | | | | 31 | | 6.30 |
| 4.8 gal | cocoa dimethyl benzyl amine HCl | 0.5 | 12.5 | | | | | 29 | — |
| 1.8 gal | dimethyl dicocoa ammonium chloride | 0.5 | 17.5 | (formed a precipitate in the brine) | | | 24 | | 6.33 |
| 10 lb | polyoxyethylene tallow amide | 0.5 | 7.5 | 12 | | | 22 | | 6.33 |

Structure for acrylamide copolymer:

$$[-\underset{\underset{H}{|}}{\overset{\overset{H}{|}}{C}}-\underset{\underset{C=O}{|}}{\overset{\overset{H}{|}}{C}}-]$$

with N—O—CH$_2$—CH$_2$—N$^+$(CH$_3$)$_3$ [CH$_3$SO$_4$]$^-$

Example 2

The second set of tests employed only treating solutions containing the epichlorohydrin-dimethylamine copolymer clay stabilizing agents of the present invention at various concentrations in carrying solutions. The test procedures employed here were substantially the same as described above with respect to Example 1 and the results of these tests are set forth in Table 2 below.

As can be seen from the study of Table 2, the effectiveness of the treating agents of the present invention is enhanced when they are employed in conjunction with a non-swelling media, such as acid or salt solutions. It is thought that this enhanced effect occurs because the non-swelling media prevents the clay platlets from initial separation until the polymeric clay stabilization agents of the present invention can cover the necessary sites to prevent swelling.

TABLE 2

Relative Effectiveness of Epichlorohydrin-Dimethylamine Copolymer Various Fluids and at Various Loadings

| gal., active agent per 1000 gal base fluid | Base Fluid | Appearance of Clay | | | Appearance of Water | | | | Solution pH |
|---|---|---|---|---|---|---|---|---|---|
| | | ml., Gray (fine) or Flocculent ppt. | ml., Swollen Clay | ml., Clay Suspension (sharp boundary against $H_2O$) | ml., Very Turbid | ml., Turbid | ml., Slightly Turbid | ml., Clear | |
| 3 | fresh water | 11.5 | | | | | | 40 | 7.45 |
| 5 | fresh water | 9 | | | | | | 39 | 7.10 |
| 7 | fresh water | 0.5 | 7 | | | 40 | | | 7.20 |
| 9 | fresh water | 0.5 | 6 | | | 39 | | | 7.30 |
| 12 | fresh water | 0.5 | 6 | | | 39 | | | 7.35 |
| 3 | 15% HCl | 3.7 | | | | | | 38 | 0 |
| 3 | 2% HCl | 4.5 | | | | | | 38 | 8.00 |
| 3 | 3% CaCl$_2$ | 4.5 | | | | | | 38 | 7.15 |
| 1 | 8% NaCl | 0.3 | 8 | | | | 34 | | 6.00 |
| 3 | 8% NaCl | 4.5 | | | | | | 37.5 | 6.10 |

TABLE 2-continued

Relative Effectiveness of Epichlorohydrin-Dimethylamine Copolymer
Various Fluids and at Various Loadings

| gal., active agent per 1000 gal base fluid | Base Fluid | Appearance of Clay | | | Appearance of Water | | | | Solution pH |
|---|---|---|---|---|---|---|---|---|---|
| | | ml., Gray (fine) or Flocculent ppt. | ml., Swollen Clay | ml., Clay Suspension (sharp boundary against H$_2$O) | ml., Very Turbid | ml., Turbid | ml., Slightly Turbid | ml., Clear | |
| 5 | 8% NaCl | 4 | | | | | | 38 | 6.25 |
| 7 | 8% NaCl | 3.8 | | | | | | 38 | 6.35 |

Example 3

The emulsion properties of the clay stabilization agents of the present invention were tested in order to determine the effect of introduction of such treating solutions into boreholes where crude oil may be present, for example. Thus, fifty-fifty oil-water emulsions were prepared, the water containing either no active clay stabilizing agents or five gallons of the epichlorohydrin-dimetheylamine copolymer treating agent per 1000 gallons of water. In each case, the oil-treating agent (or oil-water) mixtures were stirred for one minute with a mechanical stirrer (Sargents-Heller adjustable speed GT 21). At the end of this period the ml. of water which "break out" of the emulsion were observed and recorded, every minute for the first 10 minutes and then at the 20 and 30 minute intervals. The ml. of water which broke out were then calculated as percentages of total volume and the results recorded in Table 3.

As can be seen by the study of Table 3, while the clay stabilization agents of the present invention do not create emulsions, they do not prevent or alter the characteristics of emulsions which may form.

from cylinders approximately 3.75 cm ID, having an effective length between the stoppers of 4.7 cm. The volume of these cores was about 51.9 cm$^3$, and (assuming 30% void space) the void space was 15.6 cm$^3$. The core comprised a mixture of 95% weight percent washed and dried sand and 5% of 325 mesh bentonite. At each end of the core a 0.6 cm layer of washed and dried sand was added and 200 mesh screens were used to retain the sand in the core. The test conditions employed were 75±3° F. and a test pressure drop across the core of 7.00±0.32 psi head pressure.

In order to determine the initial flow rate of each core, a brine sample (8% NaCl) in the amount of 750 ml was employed. In the first core (the results of which are set forth in FIG. 1), a treatment solution, having a concentration of 12.5 gal of the clay stabilizing agent of the present invention per 1000 gal 8% NaCl brine was introduced, in an amount of 150 ml., into the core sample. Water in an amount of 750 ml. was used after the treatment. After the water treatment, 600 ml. of a 15% HCl solution was passed through the core, followed by a second volume of 750 ml. H$_2$O.

In the second core the same procedures were again employed except that a treating solution was prepared

TABLE 3

EMULSION TEST

Emulsions: 50:50 Oil:Water  
Gal Active Agent Per 1000 Pat

Temperature 77±2° F.  
Percent Breakout With Time (Minutes)

| Oil | Water | 1 | 2 | 3 | 4 | 5 | 6 | 7 | 8 | 9 | 10 | 20 | 30 |
|---|---|---|---|---|---|---|---|---|---|---|---|---|---|
| Diesel #2 | None | 50 | 99 | 100 | | | | | | | | | |
| | 5 | 26 | 78 | 90 | 98 | — | 100 | | | | | | |
| Crude Oil (Austin Chalk) | None | 4 | 74 | 74 | 74 | — | 84 | 84 | 84 | 84 | 84 | — | 82 |
| | 5 | 7 | 96 | 96 | 96 | 96 | 96 | 96 | 96 | 96 | 96 | 96 | 96 |
| Crude Oil (Lindsay, Ok. 28° API) | None | 2 | 2 | 2 | 2 | 2 | 2 | 2 | 2 | 2 | 2 | 2 | 2 |
| | 5 | 2 | 2 | 2 | 2 | 2 | 2 | 2 | 2 | 2 | 2 | 2 | 2 |
| Crude Oil (Bradley) | None | 2 | 2 | 2 | 2 | 2 | 2 | 2 | 2 | 2 | 2 | 2 | 2 |
| | 5 | 2 | 2 | 2 | 2 | 2 | 2 | 2 | 2 | 2 | 2 | 2 | 2 |
| Crude Oil (Jicarella 50° API) | None | 25 | 47 | 72 | 90 | 98+ | 98+ | — | — | — | 99+ | — | — |
| | 5 | 21 | 41 | 64 | 82 | — | — | — | 97 | — | — | (99 at 15 min) | |

Example 4

Figure 2:
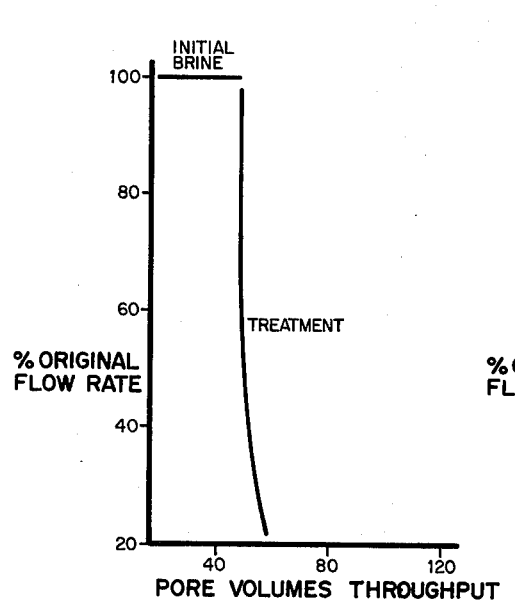

In this example, the clay stabilization properties of the epichlorohydrin-dimethylamine copolymers described in detail above were tested by applying them, in treating solution form, to synthetic cores (see FIG. 1). Further, these results were compared to those obtained when a different polymeric agent was used (see FIG. 2) and where no treating agent was employed as a control (see FIG. 3). These synthetic cores were constructed comprising 10 lbs. of polyacrylamide per 1000 gal. of 8% NaCl brine. Further, blockage was so severe that introduction of H$_2$O after the treatment was not attempted. FIG. 2 reflects the flow data obtained from the core.

Figure 3:
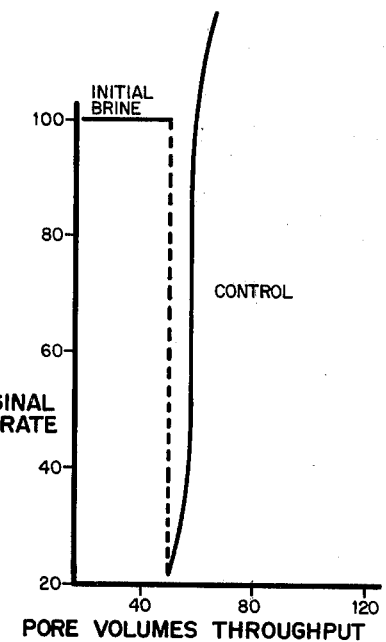

In the third core water was employed as a control. This resulted in immediate blockage of the core and then a subsequent washing out of the clay contained therein so that the flow rate increased rapidly. Of course sand washing out would not occur in a geological formation and the initial blockage would present the exact problem which is addressed by the present invention. The results of this test are depicted in FIG. 3.

Thus, a study of FIG. 1 demonstrates that while the flow rate decreases during treatment of the core, water passes through the core at significantly better flow rates after treatment and this improved flow is affected only slightly even after the core sample has been subjected to an HCl treatment.

Further, a significant increase in flow is obtained when the treating agent of the present invention is employed as compared to no treating agent (FIG. 3) or in comparison to another polymeric substance (FIG. 2).

While this invention has been described in relation to the preferred embodiments thereof, various modifications and alterations will now be apparent to those skilled in the art and all such modifications and alterations as fall within the scope of the appended claims are intended to be covered thereby.

What is claimed is:

1. A method for stabilizing an earth formation which comprises fine particulate materials selected from the group consisting of clay, mineral particles less than about 7 microns, and mixtures thereof, comprising contacting said formation with an effective amount of copolymer of epichlorohydrin and dimethylamine.

2. The method of claim 1 wherein said copolymer of epichlorohydrin and dimethylamine is contacted with said formation by employing an aqueous solvent carrier fluid.

3. The method of claim 2 wherein said aqueous solvent is a brine.

4. The method of claim 3 wherein said brine comprises a salt selected from the group consisting of potassium chloride, ammonium chloride, calcium chloride, sodium chloride, and mixtures thereof.

5. The method of claim 2 wherein said copolymer of epichlorohydrin and dimethylamine is present in an amount of from about 0.5 pounds per thousand gallons of carrier fluid to about 250 pounds per thousand gallons of carrier fluid.

6. The method of claim 5 wherein said copolymer is present in an amount of from about 2 to about 25 pounds per thousand gallons of carrier fluid.

7. The method of claim 1 wherein said copolymer of epichlorohydrin and dimethylamine has a mole ratio of epichlorohydrin to dimethylamine of from about 0.79 to about 0.93.

8. The method of claim 7 wherein said mole ratio of epichlorohydrin to dimethylamine is about 0.85.

9. The method of claim 1 wherein said clay containing formation is treated with a salt brine prior to being contacted with said copolymer of epichlorohydrin an dimethylamine.

10. A method for stabilizing clay containing formations penetrated by a well bore, said stabilization being substantially permanent in that the clay within the formation remains in a stabilized condition even after contact with acid solutions subsequent to the stabilization treatment, comprising contacting said clay containing formations with an effective amount of a treating solution comprising a copolymer of epichlorohydrin and dimethylamine, said copolymer having a mole ratio of epichlorohydrin and dimethylamine in the range of from about 0.79 to about 0.93.

11. The method of claim 10 wherein the mole ratio epichlorohydrin to dimethylamine is about 0.85.

12. The method of claim 10 and further comprising contacting said clay formation with a brine prior to contacting said formation with the treating solution comprising a copolymer of epichlorohydrin and dimethylamine.

13. A method for stabilizing earth formations which comprise clay or mineral particles less than about 7 microns, or mixtures thereof, comprising the steps of:
(a) contacting said formation with an effective amount of a treating solution of a copolymer of epichlorohydrin and dimethylamine having a mole ratio of epichlorohydrin to dimethylamine in the range of from about 0.79 to about 0.93 by introducing said solution into the formation under pressure; and
(b) thereafter introducing a second fluid into said formation, under pressure, to facilitate further contact between said treating solution and said formation.

14. The method of claim 13 and further comprising contacting said formation with a nonswelling aqueous medium prior to introduction of said treating solution.

15. The method of claim 13 wherein said treating solution comprises said copolymer of epichlorohydrin and dimethylamine dissolved in an aqueous brine.

16. The method of claim 13 wherein said second fluid is a brine.

* * * * *

UNITED STATES PATENT AND TRADEMARK OFFICE
CERTIFICATE OF CORRECTION

PATENT NO. : 4,158,521
DATED : June 19, 1979
INVENTOR(S) : Robert W. Anderson, et al.

It is certified that error appears in the above-identified patent and that said Letters Patent are hereby corrected as shown below:

Column 4, line 3, change "premeability" to --permeability--.

Column 8, line 9, change "$H_2O$" to --$H_2O)$--;
　　　　　line 11, change "brine" to --brine)--;

Column 9, line 20, change "dimetheylamine" to --dimethylamine--;
　　　　　line 40, change "Pat" to --Gal--;
　　　　　line 58, change "Jicarella" to --Jicarilla--.

Column 12, line 7, change "an" to --and--.

Signed and Sealed this

Sixteenth Day of October 1979

[SEAL]

Attest:

RUTH C. MASON
*Attesting Officer*

LUTRELLE F. PARKER
*Acting Commissioner of Patents and Trademarks*

Disclaimer 4,158,521.—*Robert W. Anderson*, Fort Worth, and *Bob G. Kannenberg*, Arlington, Tex. METHOD OF STABILIZING CLAY FORMATIONS. Patent dated June 19, 1979. Disclaimer filed Dec. 7, 1982, by the assignee, *The Western Co. of North America*.

Hereby enters this disclaimer to claims 1, 2, 3, 4 and 9 of said patent.

[*Official Gazette March 8, 1983.*]